(12) United States Patent
Kucaba et al.

(10) Patent No.: US 11,505,288 B2
(45) Date of Patent: Nov. 22, 2022

(54) APPARATUSES AND METHODS FOR HIGH-RESOLUTION PRINTING

(71) Applicant: Illinois Tool Works Inc., Glenview, IL (US)

(72) Inventors: Tracy Kucaba, South Elgin, IL (US); Paul Konrath, Elmwood Park, IL (US); Jared Herring, Mead, CO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/356,179

(22) Filed: Jun. 23, 2021

(65) Prior Publication Data

US 2021/0316824 A1   Oct. 14, 2021

Related U.S. Application Data

(62) Division of application No. 15/672,965, filed on Aug. 9, 2017, now Pat. No. 11,072,398.

(60) Provisional application No. 62/374,403, filed on Aug. 12, 2016.

(51) Int. Cl.
| | |
|---|---|
| *B41J 11/00* | (2006.01) |
| *B63B 27/22* | (2006.01) |
| *B66C 13/02* | (2006.01) |
| *B66C 23/53* | (2006.01) |
| *B41J 3/407* | (2006.01) |
| *B41J 11/06* | (2006.01) |
| *B66C 1/66* | (2006.01) |
| *F16L 1/15* | (2006.01) |
| *A61G 3/06* | (2006.01) |

(52) U.S. Cl.
CPC ............... *B63B 27/22* (2013.01); *B41J 3/407* (2013.01); *B41J 3/4073* (2013.01); *B41J 11/00* (2013.01); *B41J 11/007* (2013.01); *B41J 11/008* (2013.01); *B41J 11/06* (2013.01); *B66C 13/02* (2013.01); *B66C 23/53* (2013.01); *A61G 3/06* (2013.01); *B66C 1/66* (2013.01); *F16L 1/15* (2013.01)

(58) Field of Classification Search
CPC ......... B41J 11/00; B41J 11/007; B41J 11/008; B41J 11/06; B41J 3/407; B41J 3/4073
See application file for complete search history.

(56) References Cited

U.S. PATENT DOCUMENTS

| | | | |
|---|---|---|---|
| 2008/0012884 A1* | 1/2008 | Ben-Zur | B41J 11/0022 347/101 |
| 2009/0060696 A1* | 3/2009 | Ando | B41J 3/28 108/51.11 |
| 2013/0084157 A1* | 4/2013 | Staunton | B65G 47/91 414/752.1 |

* cited by examiner

*Primary Examiner* — Scott A Richmond
(74) *Attorney, Agent, or Firm* — Christopher R. Carroll; The Small Patent Law Group LLC

(57) ABSTRACT

A method is provided that includes acquiring positional information regarding a pallet being translated on a conveyance system with an encoding sensor disposed proximate to the conveyance system. The method also includes receiving, with at least one processor, the positional information from the encoding sensor. Further, the method includes determining timing information using the positional information. The timing information corresponds to when a substrate disposed on the pallet will be in a print zone of a print head. The method further includes controlling the print head to print on the substrate when the substrate is in the print zone and passing beneath the print head.

16 Claims, 4 Drawing Sheets

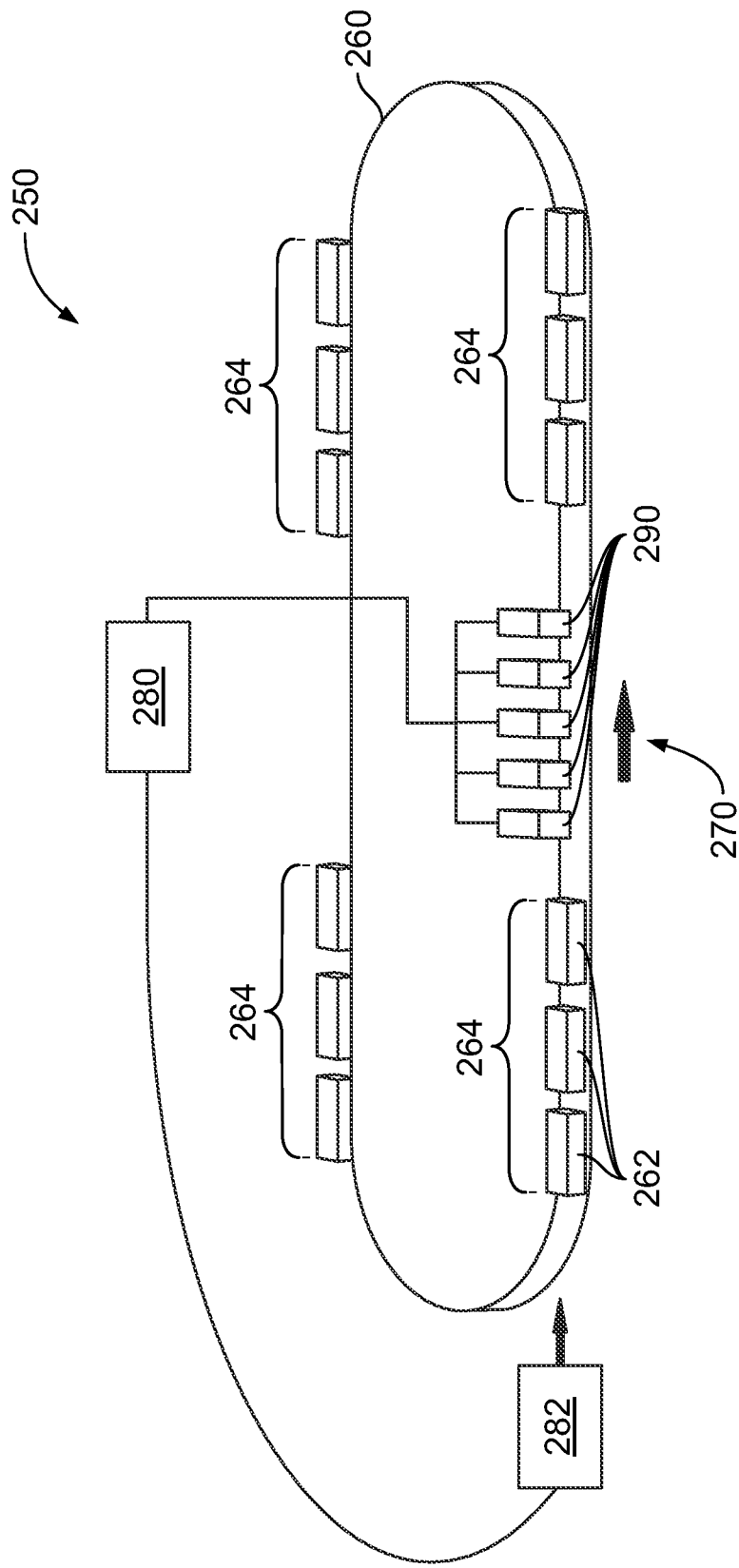

APPARATUSES AND METHODS FOR HIGH-RESOLUTION PRINTING

RELATED APPLICATIONS

This application is a divisional of and claims priority to U.S. patent application Ser. No. 15/672,965, filed Aug. 9, 2017, and entitled "Apparatuses and Methods for High-Resolution Printing" ("the 965 Application"). The 965 Application claims priority to U.S. Provisional Application Ser. No. 62/374,403, filed Aug. 12, 2016, and entitled "Apparatuses and Methods for High-Resolution Printing" ("the 403 Application"). The entire subject matter of the 965 Application and the 403 Application are hereby incorporated by reference.

FIELD OF EMBODIMENTS OF THE DISCLOSURE

Embodiments of the present disclosure generally relate to high resolution printing, for example reliable and accurate determination of position and/or velocity of items to be printed.

BACKGROUND OF THE DISCLOSURE

Objects may be transported under a print head for printing. For the best results, the position of the object should be accurately known so that the print head accurately applies ink at the correct time. Currently, encoders of transports systems that only provide information regarding position at isolated discrete points are used to determine the position of objects to be printed upon. However, such approaches suffer from less than desired accuracy (e.g., errors due to jitter and/or unaccounted for acceleration between discrete locations) and may provide less than desired resolution.

SUMMARY OF THE DISCLOSURE

Certain embodiments of the present disclosure provide a system that includes a print head, a conveyance system, an encoding sensor, and at least one processor. The print head defines a print zone, and is configured to print on objects within the print zone. The conveyance system passes through the print zone, and is configured to translate a pallet through the print zone. The encoding sensor is disposed proximate to the conveyance system, and is configured to be oriented toward the pallet and to acquire positional information regarding the pallet. The at least one processor is operably coupled to the print head and the encoding sensor, and is configured to: receive the positional information from the encoding sensor; determine timing information corresponding to when a substrate disposed on the pallet will be in the print zone; and control the print head to print on the substrate when the substrate is in the print zone.

Certain embodiments of the present disclosure provide a method. The method includes acquiring positional information regarding a pallet being translated on a conveyance system with an encoding sensor disposed proximate to the conveyance system. The method also includes receiving, with at least one processor, the positional information from the encoding sensor. Further, the method includes determining timing information corresponding to when a substrate disposed on the pallet will be in a print zone of a print head. Also, the method includes controlling the print head to print on the substrate when the substrate is in the print zone.

Certain embodiments of the present disclosure provide a system for tracking an object to be printed upon. The object is translated on a pallet with a conveyance system, with the conveyance system configured to translate the pallet through a print zone of a print head. The system includes an encoding sensor and at least one processor. The encoding sensor is disposed proximate to the conveyance system, and is configured to be oriented toward the pallet and to acquire positional information regarding the pallet. The at least one processor is configured to be operably coupled to the print head and the encoding sensor, and is configured to receive the positional information from the encoding sensor, determine timing information corresponding to when a substrate disposed on the pallet will be in the print zone, and control the print head to print on the substrate when the substrate is in the print zone.

BRIEF DESCRIPTION OF THE DRAWINGS

FIG. 2B provides a schematic view of a system utilizing a laser interferometer in accordance with various embodiments.

DETAILED DESCRIPTION OF THE DISCLOSURE

Figure 1:
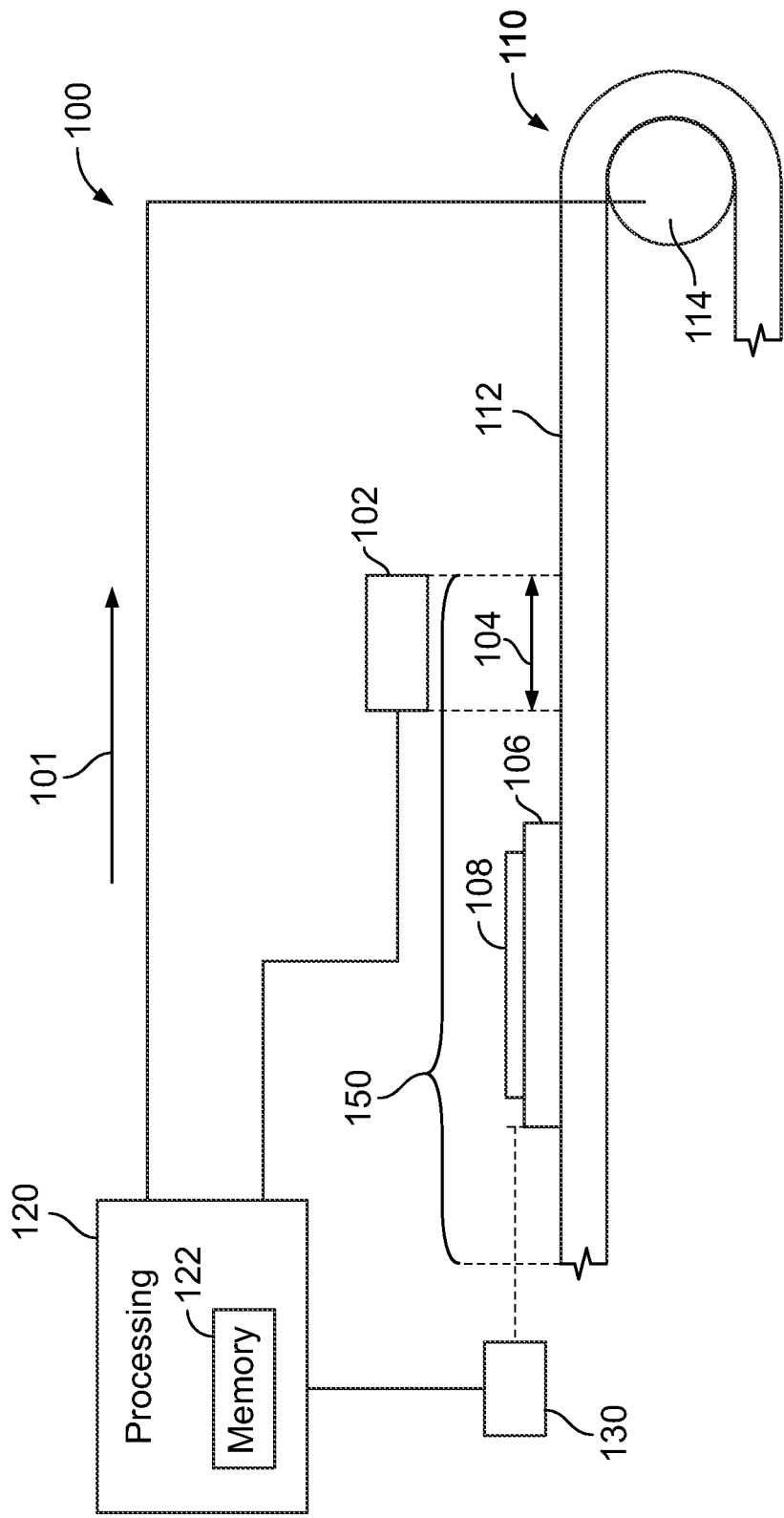
FIG. 1 provides a schematic view of a system in accordance with various embodiments.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

Embodiments of the present disclosure provide systems and methods for accurate and reliable printing. In various embodiments, information acquired using an encoding sensor (e.g., a magnetic sensor, a proximity sensor, or an optic sensor such as a laser interferometer or laser velocimeter, among others) is used to determine the position (e.g., location and velocity) of an object to be printed upon as the object advances toward a print zone. The position information is used to determine an appropriate time to activate a print head to print upon the object. Various embodiments continuously and accurately track the travel of an object to be printed upon as the object travels toward a print zone. Various embodiments provide improved resolution and accuracy of printing.

FIG. 1 provides a schematic view of a system 100 in accordance with various embodiments. As seen in FIG. 1, the measurement system 100 includes a print head 102, a conveyance system 110, an encoding sensor 130, and a processing unit 120. Generally, the conveyance system 110 is used to translate or transport objects to be printed upon to and away from the print head 102, with the print head 102 printing on the objects as they pass beneath the print head 102. In the illustrated embodiment, the print head 102 is stationary, with objects to be printed upon being transported in a direction of travel 101. The encoding sensor 130 is used to track the position and velocity of one or more objects as they travel toward the print head 102 for printing. In contrast to certain conventional systems that utilize an encoder associated with a belt drive system or other transport system that only provides discrete positional information at specific locations, the encoding sensor 130 of the illustrated embodiment provides information that may be used to continuously determine position and/or velocity of objects as they travel toward the print head 102. Generally, the processing unit 120 receives information from the encoding sensor 130, and uses the information to control the print head 102 to print on one or more objects being tracked.

The print head 102 defines a print zone 104. The print zone 104 corresponds to the location or area in which the print head 102 prints on objects. The print head 102, for example, may include a series of component heads, with each head configured to print a different color. In some embodiments, the print head 102 may also print a clear coat, for example, a protective coat, additionally or alternatively to a predetermined patterned to be printed. The print head 102 receives control signals from the processing unit 120 that direct the print head 102 to print on an object within the print zone 104.

The conveyance system 110 passes through the print zone 104. The conveyance system 110 is configured to translate a pallet 106 through the print zone 104. The depicted conveyance system 110 includes a belt 112 that is driven by a drive 114. The processing unit 120 in various embodiments provides control signals to the drive 114 to control the speed at which the belt 112 and one or more pallets 106 upon the belt 112 are translated. While a conveyor belt system is shown in the illustrated embodiment, it may be noted that other systems, including linear guide systems and/or magnet driven systems, may be utilized as a conveyance system in other embodiments. In various embodiments, the conveyance system 112 may include one or more types of conveyor systems, including belt conveyors, roller conveyors (including belt driven roller conveyors and lineshaft roller conveyors), electric track vehicle systems, or the like.

In the illustrated embodiment, a substrate 108 onto which the print head 102 prints is disposed on the pallet 106. It may be noted that while only one pallet 106 is shown in FIG. 1 for ease and clarity of illustration, multiple pallets 106 may be spaced apart on the belt 112 as part of a production process. The substrate 108 resides on the pallet 106 and is transported along the direction of travel 101 through the print zone 104, at which point the print head 102 prints on at least a portion of the substrate 108. Once the substrate 108 is printed upon, the substrate 108 may be removed from the conveyance system 110, for example for further processing.

As seen in FIG. 1, the encoding sensor 130 is disposed proximate to the conveyance system 110. The encoding sensor 130 is configured to be oriented toward the pallet 106 and to acquire positional information regarding the pallet 106. The encoding sensor 130 provides the positional information to the processing unit 120. It may be noted that as used herein being oriented toward the pallet 106 also includes being oriented toward an object such as substrate 108 that is on the pallet 106, so that orientation toward either the pallet 106 or the substrate 108 may be understood as orientation toward the pallet 106. Also, positional information regarding the pallet 106 as used here also includes positional information regarding an object such as substrate 108 disposed on the pallet 106, so that positional information of the pallet 106 and/or substrate 108 may be understood as positional information of the pallet 106.

It may be noted that the particular position and/or orientation of the encoding sensor 130 may vary in different embodiments. For example, in the illustrated embodiment, the encoding sensor 130 is disposed directly behind the pallet 106 and substrate 108 along the line of travel 101, and is oriented along the line of travel 101 toward the pallet 106 and substrate 108. In some embodiments, the encoding sensor 130 may include a laser interferometer. In some embodiments, the encoding sensor 130 may include a laser velocimeter, or laser surface velocimeter, that uses reflections of two lasers to measure a Doppler effect. In some embodiments, the encoding sensor 130 may include a magnetic sensor and/or a proximity sensor, for example. In some embodiments, the encoding sensor 130 includes at least one light source that transmits light energy toward the pallet 106 and/or substrate 108, and at least one detector that receives reflections of the transmitted light energy off of the pallet 106 and/or substrate 108. The encoding sensor 130 acquires positional information including information regarding the reflections and provides the positional information to the processing unit 120. It may be noted that, with the pallet 106 configured to accept the substrate 108 in a fixed, predetermined position, knowledge of the position of the pallet 106 may be used to determine the position of the substrate 108. In some embodiments, the encoding sensor 130 may be fixed with a fixed orientation(s) for transmitting a light beam(s), or in others the encoding sensor 130 may include one or more light sources that pivot or are otherwise controllable to continue providing light energy to a moving target.

The depicted processing unit 120 is operably coupled to the conveyance system 110, the print head 102, and the encoding sensor 130. For example, the processing unit 120 may receive positional information from the encoding sensor 130, and may provide control signals to the print head 102 and/or to the conveyance system 110. One or more component print heads of the print head 102 may be adjusted or otherwise controlled based on speed and/or location feedback from a signal provided to the processing unit 120 by the encoding sensor 130. The processing unit 120 may include processing circuitry configured to perform one or more tasks, functions, or steps discussed herein. It may be noted that "processing unit" as used herein is not intended to necessarily be limited to a single processor or computer. For example, the processing unit 120 may include multiple processors and/or computers, which may be integrated in a common housing or unit, or which may distributed among various units or housings. Generally, various aspects of the processing unit 120 act individually or cooperatively to perform one or more aspects of the methods, steps, or processes discussed herein. Instructions to perform one or more aspects of the methods, steps, or processes discussed herein may be stored on the memory 122, which may include a tangible, non-transitory computer readable medium on which the instructions are saved.

In the illustrated embodiment, the processing unit 120 is configured (e.g., programmed) to receive the positional information from the encoding sensor 130, determine timing information corresponding to when the substrate 108 (which is disposed on the pallet 106) will be in the print zone 104, and control the print head 102 to print on the substrate 108 when the substrate 108 is in a desired position within the print zone 104. For example, the position and velocity of the substrate 108, as determined using the positional information from the encoding sensor 130, may be used to determine the time at which the substrate 108 will be in a desired position to be printed upon, and the print head 102 activated to provide the desired printing at that time.

Further, the position and velocity of the substrate 108 may be continuously tracked as the substrate 108 travels to and/or through the print zone 104 to provide improved positional accuracy and corresponding improved printing accuracy and/or resolution. For example, the encoding sensor 130 may be positioned to remain oriented toward the pallet 106 and/or substrate 108 while the pallet 106 travels through a sensing zone 150. In some embodiments, the encoding sensor 130 may be pivoted or controlled to remain oriented toward (e.g., positioned such that a light beam from the encoding sensor 130 strikes the pallet 106) the pallet 106 and/or substrate 108 while the pallet 106 travels through the sensing zone 150. The sensing zone 150 may include, for example, a portion of the conveyance system 110 positioned immediately upstream (in the direction of travel 101) of the print zone 102. The sensing zone 150 in some embodiments may also include the print zone 104 and/or a portion of the conveyance system downstream (in the direction of travel 101) of the print zone 104.

In some embodiments, the processing unit 120 also controls the conveyance system 110 using the positional information. For example, if a velocity determined using the positional information is higher (or lower) than a desired velocity, the processing unit 120 may send a control signal to the drive 111 to slow down (or speed up) the belt 112.

Figure 2A:
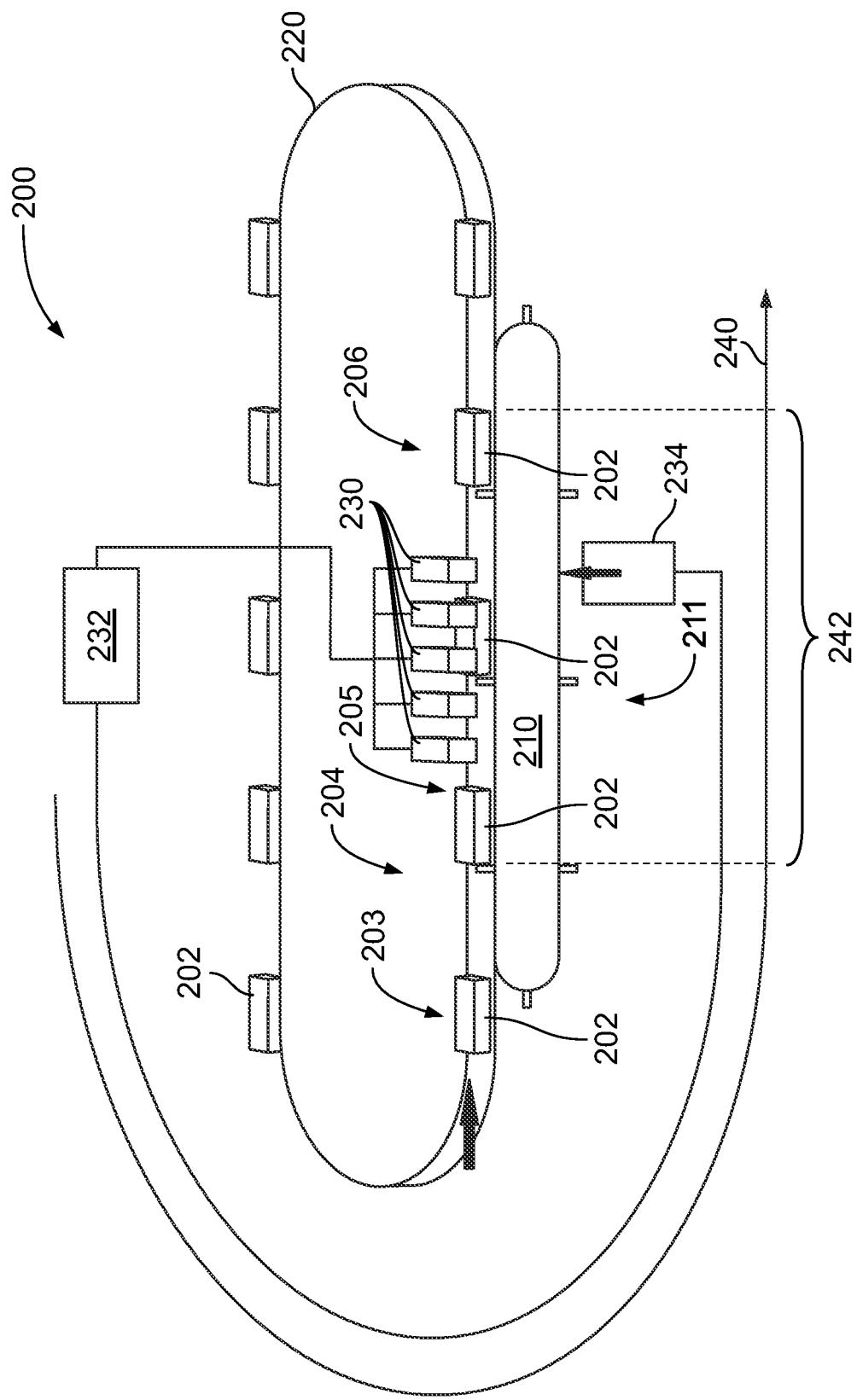
FIG. 2A provides a schematic view of a system utilizing a laser velocimeter in accordance with various embodiments.

It may be noted that, in some embodiments, two or more conveyance systems may be used, such that the conveyance system 110 may include more than one conveyance system or sub-system. For example, as seen in FIG. 2A, a system 200 includes a first conveyance system 210, and a second conveyance system 220. Generally, the first conveyance system 210 is configured to take over control of moving a pallet 202 from the second conveyance system 220 at a delivery point 204, and to return control of the pallet 202 to the second conveyance system at a reception point 206. One or both of the first conveyance system 210 or second conveyance system 220 may be controlled by one or more processors such as processing unit 120. The first conveyance system 210 in the illustrated embodiment is utilized to control movement of the pallet 202 at and near the print zone 211, while the second conveyance system 220 is utilized to control movement of the pallet 202 at points out of, or at a distance from the print zone 211 (e.g., for pickup of an unfinished product and/or delivery of a finished product).

For example, in the illustrated embodiment, the second conveyance system 220 (which may be a modular conveyance system) controls movement of the pallet 202 until the delivery point 204, at which point the first conveyance system 210, which may be a tracked external conveyor (e.g., external to the second conveyance system 220) takes control of the pallet 202. As seen in FIG. 2A, the second conveyance system 220 controls the pallet 202 at the first position 203, and the first conveyance system 210 controls the pallet 202 at the second position 205. It may be noted that at the second position 205, the pallet 202 may still be associated with the second conveyance system 220 even though motion of the pallet 202 is controlled by the first conveyance system 210.

The first conveyance system 210 (or external conveyor) continues control of the pallet 202 to and past printheads 230, which are controlled by print electronics 232. The print electronics 232 are operably coupled to laser velocimeter 234, which provides information used by the print electronics 232 to control the printheads 230 as discussed herein. After passage through the print zone 211, control of the pallet 202 is returned to the second conveyance system 220 at the reception point 206. It may be noted that, as seen in FIG. 2A, the second conveyance system 220 may define an orbit or path 240 with which the pallet 202 is associated with throughout the delivery and printing process, and the first conveyance system 210 may define a sub-path 242 or sub-section of the path for only a portion of the path 240. Use of the first conveyance system 210 taking over control proximate the print zone 211 in various embodiments allows use of the laser velocimeter 234 to better track motion of the pallet 202.

It may be noted that a single conveyance system may be used both relatively near to the print zone as well as at a distance from the print zone. As seen in FIG. 2B, the depicted system 250 includes a conveyance system 260 that controls movement of pallets 262 both near a print zone 270 and at portions of a path away from the print zone 270. The conveyance system 260 of FIG. 2B in various embodiments is configured generally similarly to the second conveyance system 220 of FIG. 2A; however, the conveyance system 260 maintains control of the pallets 262 through the print zone 270 in FIG. 2B. The system 250 includes print electronics 280 that control printheads 290 to precisely and accurately print on objects on the pallets 262 as they pass through the print zone 270. The system 250 also includes a laser interferometer 282 that provides information (e.g., regarding pallet movements and positions) for use by the print electronics 280 in controlling the printheads 290. In FIG. 2B, the pallets 262 are grouped in groups 264 (groups of three in the illustrated embodiment). Use of such groups may be employed to improve throughput, although only a single object in the print zone 270 may be sensed at a given time.

System 200 and system 250 both provide examples of systems that use a precision guided conveyor and providing a continuous encoder signal (e.g., from a laser velocimeter or laser interferometer) to print electronics for controlling print heads. Each printhead firing frequency is controlled to follow the conveyor speed and position to provide accurate placement of drops ejected from the printheads to provide a quality print.

Figure 3:
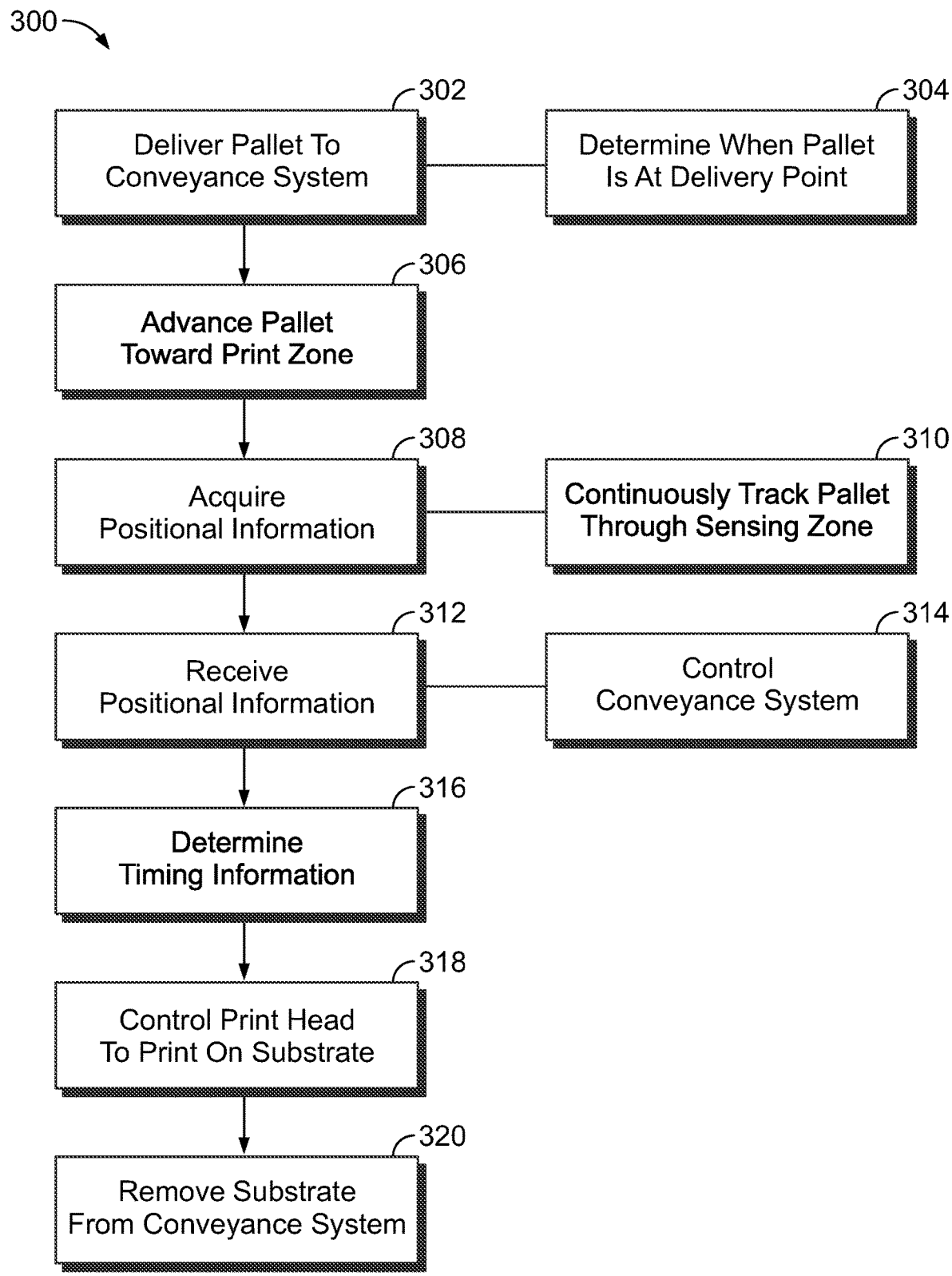
FIG. 3 provides a flowchart of a method according to an embodiment of the present disclosure.

FIG. 3 provides a flowchart of a method 300 for printing an object, in accordance with various embodiments. The method 300, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware (e.g., portions, aspects, and/or variations of the method may be implemented by one or more aspects of the processing unit 120 using instructions stored on the memory 122) to perform one or more operations described herein.

At 302, a pallet (e.g., pallet 106) is delivered to a conveyance system (e.g., conveyance system 110). A substrate (e.g., substrate 108) to be printed upon is disposed on the pallet in some embodiments. The pallet may be delivered at a delivery point from a delivery system or an additional conveyance system. In other embodiments, the substrate is delivered from a pallet of a delivery system to a pallet of a conveyance system. In the illustrated embodiment, at 304, it is determined when the pallet is at the delivery point, for example when control of the pallet movement is taken over from one conveyance system or sub-system (e.g., second conveyance system 220) by a different conveyance system or sub-system (e.g., first conveyance system 210).

At 306, the pallet is advanced toward a print zone (e.g., print zone 104) of a print head (e.g., print head 102). As the pallet is advanced, at 308, positional information regarding the pallet is acquired using an encoding sensor (e.g., encoding sensor 130). In various embodiments, the encoding sensor may include a laser interferometer or a laser velocimeter, for example. In the illustrated embodiment, at 310, the pallet is continuously tracked through a sensing zone (e.g., sensing zone 150) using the positional information At 312, the positional information (which may describe or correspond to the velocity and/or position of the pallet, for example) acquired by the encoding sensor is received by at least one processor (e.g., processing unit 120). The processing unit 120, for example, at 316, determines timing information using the positional information. The timing information corresponds to when the substrate will be in the print zone. In the illustrated embodiment, the positional information is also used, at 314, to control the conveyance system. For example, if the positional information indicates an undesired velocity, the at least one processor may adjust a control signal provided to a drive of the conveyance system to speed up or slow down the travel of the pallet, as appropriate. As another example, the determined position of the pallet may be used to determine an amount of advancement required to position the pallet in the print zone.

At 318, the print head is controlled to print on the substrate when the substrate is in a desired position in the print zone. Because the information from the encoding sensor (e.g., information continuously tracking the pallet as it advances toward the print zone) is more accurate and reliable than the use of encoders of conventional transport systems, printing with various embodiments may be done at higher speeds and/or provide improved resolution.

At 320, the substrate is removed from the conveyance system. For example, the substrate may be transferred to the delivery system at a reception point. Information from the encoding sensor and/or an encoder of the conveyance system and/or an encoder of the delivery system may be used to determine when the pallet is at the reception point.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a processor or a processing unit includes processing circuitry configured to perform one or more tasks, functions, or steps, such as those described herein. For instance, the processor may be a logic-based device that performs operations based on instructions stored on a tangible and non-transitory computer readable medium, such as memory. It may be noted that a "processor," as used herein, is not intended to necessarily be limited to a single processor or single logic-based device. For example, the processor may include a single processor (e.g., having one or more cores), multiple discrete processors, one or more application specific integrated circuits (ASICs), and/or one or more field programmable gate arrays (FPGAs). In some embodiments, the processor is an off-the-shelf device that is appropriately programmed or instructed to perform operations, such as the algorithms described herein.

The processor may also be a hard-wired device (e.g., electronic circuitry) that performs the operations based on hard-wired logic that is configured to perform the algorithms described herein. Accordingly, the processor may include one or more ASICs and/or FPGAs. Alternatively or in addition to the above, the processor may include or may be associated with a tangible and non-transitory memory having stored thereon instructions configured to direct the processor to perform the algorithms described herein.

It is noted that operations performed by the processor (e.g., operations corresponding to the methods/algorithms described herein, or aspects thereof) may be sufficiently complex that the operations may not be performed by a human being within a reasonable time period. The processor may be configured to receive signals from the various sub-systems and devices of the system or user inputs from the user. The processor may be configured to perform the methods described herein.

Processors may include or be communicatively coupled to memory. In some embodiments, the memory may include non-volatile memory. For example, the memory may be or include read-only memory (ROM), random-access memory (RAM), electrically erasable programmable read-only memory (EEPROM), flash memory, and the like. The memory may be configured to store data regarding operating parameters of the system 100.

In an exemplary embodiment, the processor executes a set of instructions that are stored in one or more storage elements, memories, and the like. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The set of instructions may include various commands that instruct the system to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
acquiring positional information regarding a pallet being translated on a conveyance system with an encoding sensor disposed proximate to the conveyance system;
receiving, with at least one processor, the positional information from the encoding sensor;
determining timing information using the positional information, the timing information corresponding to when a substrate disposed on the pallet will be in a print zone of a print head; and
controlling the print head to print on the substrate when the substrate is in the print zone and passing beneath the print head.

2. The method of claim 1, further comprising using at least one of a laser interferometer or a laser velocimeter to acquire the positional information.

3. The method of claim 1, further comprising using at least one of a magnetic sensor or a proximity sensor to acquire the positional information.

4. The method of claim 1, wherein the conveyance system comprises a first conveyance system and a second conveyance system, the method comprising taking control of moving the pallet by the first conveyance system from the second conveyance system at a delivery point, and returning control of the pallet to the second conveyance system at a reception point.

5. The method of claim 4, further comprising determining when the pallet is at the delivery point or the reception point.

6. The method of claim 1, further comprising controlling the conveyance system using the positional information.

7. The method of claim 1, further comprising continuously tracking the pallet through a sensing zone using the positional information.

8. The method of claim 1, wherein the positional information corresponds to location and velocity of the pallet.

9. The method of claim 1, wherein the positional information is acquired as the pallet is in motion traveling toward the print zone.

10. A method comprising:
acquiring positional information regarding a pallet being translated on a conveyance system with an encoding sensor disposed proximate to the conveyance system, wherein the positional information is acquired as the pallet is in motion traveling toward a print zone of a print head, wherein the positional information corresponds to location and velocity of the pallet;
receiving, with at least one processor, the positional information from the encoding sensor;
determining timing information using the positional information, the timing information corresponding to when a substrate disposed on the pallet will be in the print zone of the print head; and
controlling the print head to print on the substrate when the substrate is in the print zone and passing beneath the print head.

11. The method of claim 10, further comprising using at least one of a laser interferometer or a laser velocimeter to acquire the positional information.

12. The method of claim 10, further comprising using at least one of a magnetic sensor or a proximity sensor to acquire the positional information.

13. The method of claim 10, wherein the conveyance system comprises a first conveyance system and a second conveyance system, the method comprising taking control of moving the pallet by the first conveyance system from the second conveyance system at a delivery point, and returning control of the pallet to the second conveyance system at a reception point.

14. The method of claim 13, further comprising determining when the pallet is at the delivery point or the reception point.

15. The method of claim 10, further comprising controlling the conveyance system using the positional information.

16. The method of claim 10, further comprising continuously tracking the pallet through a sensing zone using the positional information.

* * * * *